United States Patent
Wollenweber et al.

(10) Patent No.: US 9,466,132 B2
(45) Date of Patent: Oct. 11, 2016

(54) SYSTEMS AND METHODS FOR MOTION MITIGATION DETERMINATIONS

(71) Applicant: General Electric Company, Schenectady, NY (US)

(72) Inventors: Scott David Wollenweber, Waukesha, WI (US); Michael Joseph Cook, Oconomowoc, WI (US)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 14/563,015

(22) Filed: Dec. 8, 2014

(65) Prior Publication Data

US 2016/0163042 A1   Jun. 9, 2016

(51) Int. Cl.
*G06T 7/00* (2006.01)
*G06T 11/00* (2006.01)
*G01T 1/29* (2006.01)

(52) U.S. Cl.
CPC ........... *G06T 11/003* (2013.01); *G01T 1/2914* (2013.01)

(58) Field of Classification Search
None
See application file for complete search history.

(56) References Cited

U.S. PATENT DOCUMENTS

| | | | |
|---|---|---|---|
| 5,983,251 A | 11/1999 | Martens et al. | |
| 7,117,026 B2 | 10/2006 | Shao et al. | |
| 7,136,518 B2 | 11/2006 | Griffin et al. | |
| 7,367,953 B2 | 5/2008 | Salla et al. | |
| 7,680,240 B2 | 3/2010 | Manjeshwar et al. | |
| 7,831,088 B2 | 11/2010 | Frakes et al. | |
| 8,175,360 B2 | 5/2012 | Razifar et al. | |
| 8,233,689 B2 | 7/2012 | Razifar et al. | |
| 8,299,438 B2 | 10/2012 | Fenchel et al. | |
| 8,411,915 B2 | 4/2013 | Wischmann et al. | |
| 2005/0123183 A1 | 6/2005 | Schleyer et al. | |
| 2008/0273780 A1* | 11/2008 | Kohlmyer | A61B 6/032 382/131 |
| 2009/0124900 A1* | 5/2009 | Vandenberghe | G06T 11/005 600/436 |
| 2010/0135556 A1 | 6/2010 | Razifar et al. | |
| 2012/0220858 A1* | 8/2012 | Carroll | G01R 33/56366 600/420 |
| 2012/0281897 A1* | 11/2012 | Razifar | A61B 6/032 382/131 |
| 2013/0294670 A1 | 11/2013 | Park et al. | |
| 2013/0303898 A1* | 11/2013 | Kinahan | A61B 6/527 600/425 |
| 2013/0310655 A1* | 11/2013 | Sachs | A61B 5/721 600/301 |
| 2014/0153806 A1* | 6/2014 | Glielmi | G01R 33/481 382/131 |

OTHER PUBLICATIONS

E.D. Brandner et al., "Abdominal organ motion measured using 4D CT", Int. J. Radiat. Oncol., Biol., Phys. 65(2), 554-560, 2006.

(Continued)

*Primary Examiner* — Jason Heidemann
*Assistant Examiner* — Brian Shin
(74) *Attorney, Agent, or Firm* — Dean D. Small; The Small Patent Law Group, LLC

(57) ABSTRACT

Emission event data of an object of interest is acquired with a detector comprising a plurality of rings defining corresponding slices. Also, an amount of motion for each of a plurality of segments is determined with one or more processing units, wherein each segment corresponds to less than an axial field of view (AFOV) of the detector. Further, motion mitigation is performed for segments for which the amount of motion satisfies a threshold to provide motion mitigated data, and not performed for segments for which the amount of motion does not satisfy the threshold to provide non-mitigated data. An image is reconstructed using the motion mitigated data and the non-mitigated data, and the image is displayed on a display.

20 Claims, 8 Drawing Sheets

(56) References Cited

OTHER PUBLICATIONS

P.E. Kinahan et all; "Attenuation Correction for a combined 3D PET/CT Scanner", Med. Phys. 25(10), 2046-2053, 1998.
P Razifar et al; "Volume-Wise Application of Principal Component Analysis on Masked Dynamic PET Data in Sinogram Domain". IEEE Trans. Nucl. Sc. 53, 2759-68, 2006.
M. M. Osman et al.; "Clinically significant inaccurate localization of lesions with PET/CT: Frequency in 300 patients", J. Nucl. Med. Technol. 44, 240-243, 2005.
Y.E. Erdi et al., "PET-CT: The CT motion quantitation of lung lesions and its impact on PET-measured SUVs", J. Nucl. Med. Technol. 45, 1287-1292, 2004.
M. Dawood et al; "Respiratory Gating in positron emission tomography: A quantitive cornparisioin of different gating schemes", Med. Phys. 34(7), 2007.
P. Razifar et al; "Principal Component Analysis with Pre-Normalization Improves the Signal-to-Noise Ratio and Image Quality in Positron Emission Tomography Studies of Amyloid Deposits in Alzheimer's Disease" Phys. Med. Biol. (54) 2009, 3595-3612.

\* cited by examiner

SYSTEMS AND METHODS FOR MOTION MITIGATION DETERMINATIONS

BACKGROUND OF THE INVENTION

The subject matter disclosed herein relates generally to imaging systems, and more particularly to methods and systems for predicting and/or accounting for the occurrence of motion (e.g., respiratory motion) for data acquired using a Positron Emission Tomography (PET) imaging system.

During operation of medical imaging systems, such as PET imaging systems and/or multi-modality imaging systems (e.g., a PET/Computed Tomography (CT) imaging system, a PET/Magnetic Resonance (MR) imaging system), the image quality may be affected by motion of the object being imaged (e.g., a patient). In particular, motion of the imaged object may create image artifacts during image acquisition, which degrades the image quality. Respiratory motion is an example of a common source of involuntary motion encountered in medical imaging systems.

Motion artifacts in acquired imaging information may be addressed by various motion mitigation processing techniques. However, application of motion mitigation techniques may result in drawbacks, such as an increase in noise (e.g., by decreasing the signal-to-noise ratio due to discarding portions of the signal) and/or reduction of image quality resulting from the discarding of information.

BRIEF DESCRIPTION OF THE INVENTION

In an embodiment, a method includes acquiring, with a detector comprising a plurality of rings defining corresponding slices, emission event data (e.g., positron emission tomography (PET) coincidence data) of an object of interest. The method also includes determining, with one or more processing units, an amount of motion for each of a plurality of segments, wherein each segment corresponds to less than an axial field of view (AFOV) of the detector. Further, the method includes performing, with the one or more processing units, motion mitigation for segments for which the amount of motion satisfies a threshold to provide motion mitigated data, and not performing motion mitigation for segments for which the amount of motion does not satisfy the threshold to provide non-mitigated data. Also, the method includes reconstructing an image using the motion mitigated data and the non-mitigated data. The method also includes displaying the image on a display.

In an embodiment, a Positron Emission Tomography (PET) imaging system is provided. The PET imaging system includes a PET detector, at least one processing unit, and a display. The PET detector includes a plurality of rings defining corresponding slices. At least one processing unit operably coupled to the PET detector and configured to acquire from the detector PET coincidence event data of an object of interest; determine an amount of motion for each of a plurality of segments, wherein each segment corresponds to less than an axial field of view (AFOV) of the detector; perform motion mitigation for segments for which the amount of motion satisfies a threshold to provide motion mitigated data, and to not perform motion mitigation for segments for which the amount of motion does not satisfy the threshold to provide non-mitigated data; and reconstruct an image using the motion mitigated data and the non-mitigated data. The display is configured to display the reconstructed image.

DETAILED DESCRIPTION OF THE INVENTION

Figure 1:
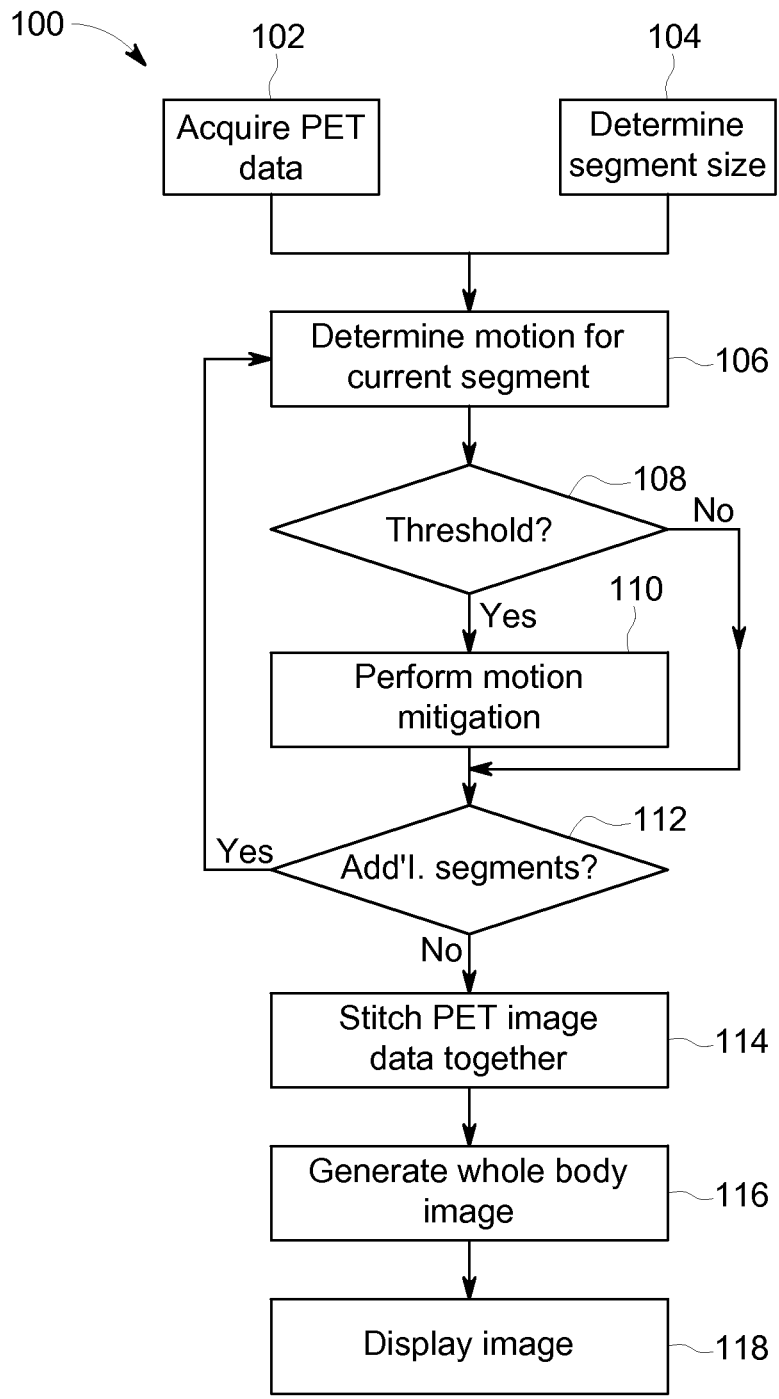
FIG. 1 is a flowchart of a method for PET imaging in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. For example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated, such as by stating "only a single" element or step. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

In various embodiments, a distance (e.g., a parameterized distance) is utilized to define an axial segment smaller than the axial field of view (AFOV) of a scanner or detector for performing motion identification and/or mitigation, such as PCA-based PET data driven gating (DDG). By utilizing such a distance smaller than the AFOV, the amount of data undergoing motion mitigation may be narrowed or reduced. In some embodiments, a slice-window approach is utilized, providing for improved tailoring of a segment size for a particular application.

In certain conventional approaches utilizing gating in PET, following generation of a waveform, a cycle definition occurs by calculating trigger locations, for example at end of inspiration. It should be realized by one skilled in the art that cycles may also be defined in various other ways, including use of the waveform amplitude. The processing occurs for all data for a given bed or detector position. Such a bed or detector position, for example, may range in axial extent from 15-25 centimeters. Once triggers are determined, the coincidence data may either be gated to produce 4D PET image volumes or processed to use data during only the most quiescent portion of each respiratory cycle, or for a selected range of motion amplitude. However, such motion mitigation may incur other image quality limitations, such as lower statistical quality due to shorter data acquisition time. Further, these and/or other limitations of motion mitigation may occur without diagnostic benefit, for example, if motion mitigation is performed for areas or volumes larger than diagnostically necessary or useful.

Various embodiments provide for improved imaging via improved identification of locations or portions of imaging data for which motion mitigation processing may be performed to sufficiently address motion, while reducing, limiting, or avoiding motion mitigation processing for locations or portions of imaging data for which motion mitigation is not necessary, desirable, or useful (e.g., where the costs of motion mitigation such as noise outweigh the diagnostic benefits of motion mitigation).

Additionally or alternatively, various embodiments use predictive techniques for identifying one or more body portions that may be sufficiently affected by motion to benefit from motion mitigation. For example, before acquisition of PET information, one or more body portions likely to be affected by motion (e.g., respiratory motion) may be identified, and scanning protocols for acquiring the information may be configured to address the motion. For example, longer durations may be utilized for the collection of information for detector or bed positions corresponding to portions of the body more likely to be affected by motion, while shorter durations may be utilized for positions corresponding to portions less likely to be affected by motion (and/or for portions for which effects of motion have little or no diagnostic consequence).

Various embodiments provide for improved addressing of motion in PET scanning, for example by acquiring additional information for locations likely to be affected by motion and/or by improving identification of portions for which motion mitigation processing is to be applied. For example, various embodiments allow for the application of motion mitigation to axial widths less than an AFOV of a detector (e.g., an AFOV at a bed or detector position). A technical benefit of at least one embodiment includes reduction in noise and/or improvement in image quality by eliminating or reducing unnecessary motion mitigation. For example, motion mitigation processing may be axially localized to reduce the likelihood of image quality reduction for areas where motion is not affecting features of diagnostic importance. Further, various embodiments provide for improved likelihood of detecting a sufficient motion with a volume being analyzed (e.g., by reducing the risk of a motion within a portion of an AFOV being diluted by a lack of motion in other portions of the AFOV). More accurate or otherwise appropriate decisions may be made on whether or not to apply motion mitigation processing due to an increase in the local proportion of feature based motion versus the total amount of non-moving data, for example within a given AFOV. A technical benefit of at least one embodiment includes improved data acquisition for PET scans likely to be affected by motion. While various embodiments discussed herein may utilize PET scanning, it may be noted that other imaging modalities, such as single photon emission computed tomography (SPECT) may be employed additionally or alternatively in various embodiments.

FIG. 1 provides a flowchart of a method 100 for imaging an object, in accordance with various embodiments. The method 100, for example, may employ or be performed by structures or aspects of various embodiments (e.g., systems and/or methods and/or process flows) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 100 may be able to be used as one or more algorithms to direct hardware (e.g., one or more processing units including one or more aspects of the motion mitigation module 294) to perform one or more operations described herein.

At 102, positron emission tomography (PET) coincidence data is acquired. The information may be acquired, for example, using a PET detector (see, e.g., FIG. 8), and may be stored in a listmode. In some embodiments, listmode data may be stored for each coincident event (e.g., each event corresponding to detection by opposed portions of a PET detector, or each paired event), with a position (e.g., x and y), a time, and an energy level stored in listmode for each coincident event. PET coincidence data is an example of emission event data. In various alternate embodiments, other types of imaging information may be acquired. For example, emission event data from a SPECT scan, using one or more SPECT detectors, may be acquired and utilized additionally or alternatively to PET coincidence data.

In various embodiments, the PET coincidence data may be acquired using a cylindrical detector including rings of detector elements, with the detector advanced relative to a bed or table (e.g., the detector may be advanced and the bed or table fixed, or the bed or table may be advanced and the detector fixed) along an axial length of an object (e.g., human patient) to be imaged. The detector may be advanced in a step-and-shoot manner, in which the detector is advanced to a given detector or bed position along the axial length of an object, the detector is then stopped, information is acquired while the detector is stopped, and, following a desired amount of time for information acquisition, the detector is then advanced to one or more subsequent detector positions differently located along the axial length of the object to be imaged. Alternatively, the detector may be advanced continuously along the length of the object in some embodiments.

Figure 2:
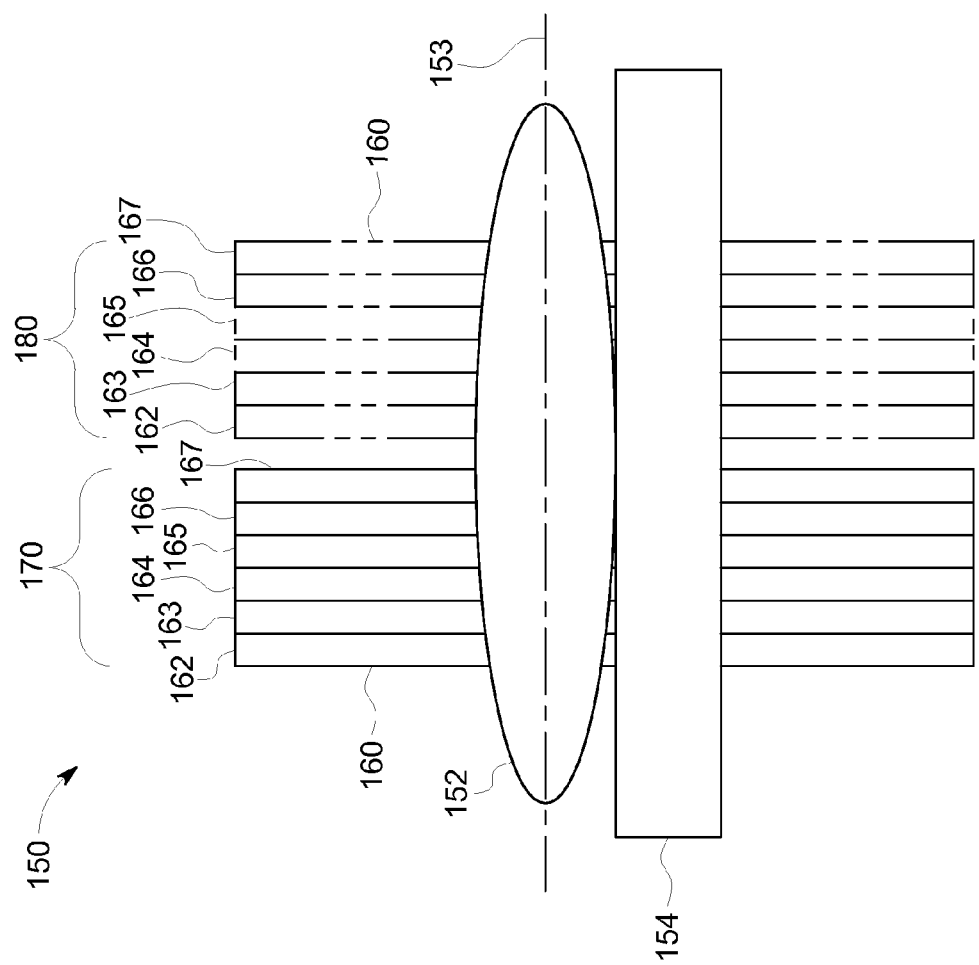
FIG. 2 provides a schematic view of a PET detector system in accordance with various embodiments.

FIG. 2 provides a schematic view of a PET detector system 150 that may be used to acquire PET imaging data of an object 152. The object 152 is disposed on and supported by a bed 154, and extends along an axis 153. The PET detector system 150 includes a detector 160 that includes rings 162, 163, 164, 165, 166, 167 of scintillation devices. At a first bed position or detector position 170, the detector 160 is disposed about a first portion of the object 152 located at a first position along the axis 153 or along the axial length of the object 152. At a second bed position or detector position 180 (shown in phantom lines in FIG. 2), the detector 160 is disposed about a second portion of the object 152 located at a second position along the axis 153 or along the axial length of the object 152. The first bed position 170 and the second bed position 180 are shown separated by a distance in FIG. 2 for clarity and ease of illustration. It may be noted that, in various embodiments, adjacent bed or detector positions may share a common border, or as another example, may overlap. It may further be noted that only two bed or detector positions are shown in FIG. 2 for clarity and ease of illustration; however, more positions may be utilized in various embodiments.

Each ring of the detector 160 may acquire PET information independently of the other rings. Thus, information for each ring, and/or each ring at each bed position, may be separately stored and analyzed. For example, returning to FIG. 1, at 104, a segment size is determined. Generally, a segment corresponds to the axial length for which data will be independently analyzed (e.g., for motion detection and/or mitigation). For example, a principle components analysis (PCA) may be applied independently to the data for each segment at each detector or bed position, so that the data for a particular segment and bed position is analyzed separately from the data from the other segments and bed positions. (Generally, a PCA technique may find the dominant eigenvectors from a covariance matrix based on a sorted subset of PET coincidence data. The covariance matrix may be based on an average sinogram calculated from the subset of the PET coincidence data, and measures a deviation of each dimension from the mean with respect to each other.) The segment size in the illustrated embodiment is less than an axial field of view of the detector. Use of a smaller segment size than an axial field of view of a detector allows for improved precision in the identification of motion. For example, for a motion that only occurs for a given segment, only the data in that segment may be processed to mitigate motion instead of processing the data for all segments for a given bed or detector position.

With continued reference to FIG. 2, in the illustrated embodiment, the detector 160 has six rings of scintillation devices. For a step-and-shoot arrangement, each ring may be understood as defining a slice of data obtained by the ring at a given bed position. The AFOV of the detector is thus six rings, or the width of six slices. In the illustrated embodiment, the segment size is less than six ring widths or six slice widths. Generally, selection of a larger segment size provides more information per segment, while selection of a smaller segment size provides improved refinement in terms of specificity of the identification of the location of motion. In various embodiments, the segment size may be selected based on, for example, patient size (e.g., larger segment size for larger patients), organ extent, available computational resources and/or procedure. For applications where motion may occur over a relatively small area or for which a higher level of precision in identifying the location of motion is desired, a smaller segment size may be selected. In some embodiments, the segment size may be a single ring width or a single slice width (e.g., one segment defined by information from the ring 162 at a given position, another segment defined by information from the ring 163 at the given position, and so on). In other embodiments, the segment size may define a window including more than one slice of data or correspond to more than one ring. In some embodiments, the window may be overlapping (e.g., a slice of data from a given ring may be a part of more than one segment) or not (e.g., a slice of data from a given ring is present in only one segment). Use of overlapping windows may provide additional accuracy or refinement, while use of non-overlapping windows may reduce computation requirements in various embodiments. In contrast to utilizing all data for a bed position, the use of smaller segments in various embodiments provides for more precise location of movement. For example, by providing more precise location of movement, and addressing only those locations for which motion is a sufficient concern, less motion mitigation processing may be performed, thereby conserving computational resources as well as reducing any drawbacks (e.g., noise or other reduction in image quality) resulting from motion mitigation processing. An additional benefit that may be realized in various embodiments is reduced scan time if the improved precision of detected movement location precision is leveraged to regulate data acquisition time at any given position. The particular segment size and/or configuration (e.g., single slice, window with overlapping slices, window with non-overlapping slices) may be tailored based on, for example, the expected motion for a particular application, the diagnostic importance of identifying motion for a particular application, and/or the computational resources available or practical for a particular application, among others. for particular applications. For example, where motion may be highly localized and/or where noise reduction is of particular import, a generally smaller segment size may be selected. By way of example, in some embodiments, the AFOV of a detector may be between 15-25 centimeters, and the segment size or width may be selected to be 5 centimeters.

Figure 3:
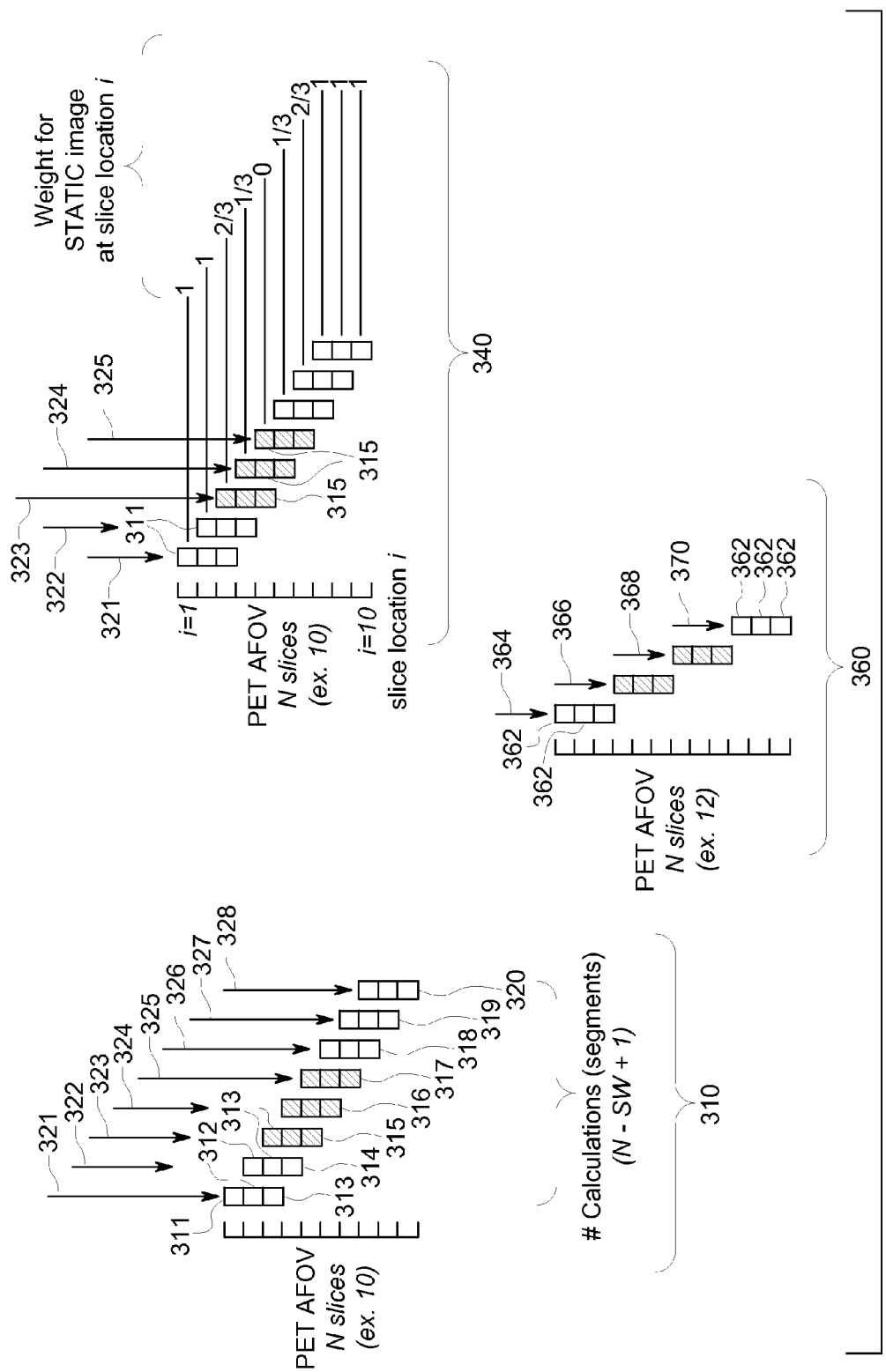
FIG. 3 depicts various segment windows in accordance with various embodiments.

FIG. 3 is example of segment windows formed from slices of data concurrently acquired at a given bed position. In view 310, use of a sliding window having a width of three slices (corresponding to information collected at a group of three adjacent rings) is shown. As seen in view 310, the AFOV is divided into ten slices—namely slices 311, 312, 313, 314, 315, 316, 317, 318, 319, and 320. The slices are organized into sliding windows, each having a width of three slices. In view 310, with ten slices and a slice width of three, 8 segments result—namely segments 321, 322, 323, 324, 325, 326, 327, and 328. Each segment made of a group of 3 adjacent slices. With the segments or windows overlapping, each slice contributes to at least one segment, and contributes to up to as many as three segments. A given motion metric may be independently determined for each segment. In the illustrated embodiment, information from the slices 311 and 320, which are disposed on ends of the detector, only contributes to one segment each, whereas information from the other slices is used in conjunction with at least two slices. For example, slice 312 forms a part of segments 321 and 322, and slice 313 forms a part of segments 321, 322, and 323. The table below summarizes the various slices that make up the various segments of the illustrated embodiment.

| Segment | Component Slices |
| --- | --- |
| 321 | 311, 312, 313 |
| 322 | 312, 313, 314 |
| 323 | 313, 314, 315 |
| 324 | 314, 315, 316 |
| 325 | 315, 316, 317 |
| 326 | 316, 317, 318 |
| 327 | 317, 318, 319 |
| 328 | 318, 319, 320 |

In the illustrated embodiment, those segments for which a motion metric is determined to satisfy a threshold (see, e.g., discussion regarding steps 106 and 108 below) are shaded darker. Thus, for the segments of view 310, segments 323, 324, and 325 have been identified as satisfying a motion threshold.

In some embodiments, for each slice, a static image as well as a motion mitigation image may be generated, with the static and motion mitigation image combined using a weighting, with the sum of the weights for a segment being equal to 1. PET images from each slice may then be combined based on the weights and inserted into a combined image using information from each slice. As just one example, of a weighting scheme, view 340 of FIG. 3 illustrates example weightings. In view 340, which corresponds to the detector of view 310, slice 315 may be determined to be the slice that is most affected by motion. For example, slice 315 is the only slice present in all of the segments to be motion corrected. Thus, for slice 315 the static image may be given a weight of zero, so that the PET image from slice 315 is based entirely on the motion mitigated image. Slices immediately adjacent to slice 315 may be given a static image weight of ⅓, and slices spaced a distance of one slice from slice 315 may be given a static image weighting of ⅔, with all other slices given a static image weight of one. With a static weight of one, only the static image is used. Other weighting schemes may be employed in various embodiments. In various embodiments, a weight (e.g., a weight corresponding to a proportion between static and mitigated image information used) may be assigned to each of the sliding windows based on a detected sliding window amount of motion (e.g., an amount of motion for the slices of each sliding window, with the motion-mitigated data and non-motion-mitigated data for each slice combined based on the corresponding weight to provide information from the sliding window used for image reconstruction.

As indicated herein, in some embodiments adjacent segments or windows defining segments may not share any slices in common. View 360 illustrates a segmenting plan where adjacent segments do not overlap or share slices in common. In view 360, the detector provides 12 slices 362 of information (e.g., the detector has 12 rings or groups of rings), with the slices divided into four segments 364, 366, 368, 370, with each segment or window being four slices wide. Use of such non-overlapping windows provides fewer segments than on overlapping plan. It may be noted that use of fewer segments may reduce computational requirements relative to use of overlapping windows, while still providing improved precision in motion location identification relative to techniques based on the entire AFOV of a detector.

Returning to FIG. 1, at 106, an amount of motion for a current segment being analyzed is determined. For example, a principal components analysis (PCA) may be performed for each segment, and the value of one or more motion metrics determined. In various embodiments, the listmode data for the segment may be used to generate sinogram information. For example, coarse (down-sampled data) sinograms may be generated, resulting in reduced computational time and/or computational requirements for a system generating the sinogram. In some embodiments, sinograms may be generated, for example, for every half second of listmode information. For instance, if data for a segment is collected over 120 seconds, 240 coarse sinograms may be generated. The sinograms may be analyzed by the PCA. The analysis of the sinograms with the PCA may be utilized to identify variations in time, for example to determine motion. In some embodiments, a cyclic variation, such as respiratory motion may be analyzed or identified using the PCA. One or more metrics that may be determined using the PCA (or other computational technique) may be determined for each segment. The metric may describe or correspond to an amount of respiratory motion. For example, in some embodiments, R may be determined, where R is the ratio of a peak value in a respiratory frequency window to the mean value above the window for a Fourier transform of a waveform generated using the PCA. As used herein, "sinogram" may be understood as a general term implying counts of activity along Lines Of Response (LORs) of a detector. In general, the format of the segment data in various embodiments may be in at least one of a multitude of formats, including but not limited to sinograms, projection view data, Singles histograms, or coincidence event histograms, and is not necessarily restricted to a specific dimensional data set.

At 108, it is determined if the amount of motion from a particular segment determined at 106 satisfies a threshold. For example, if the amount of motion is equal to or greater than the threshold, the threshold may be satisfied and the method 100 may proceed to 110 for motion mitigation. However, if the amount of motion is less than the threshold, then the threshold may not be satisfied and the method 100 may proceed to 112. For example, in various embodiments where respiratory motion is to be addressed, the threshold may be a predetermined value of R as discussed herein, and the threshold value may be 15. Thus, if R for a given segment is greater than or equal to 15, motion mitigation may be applied to the particular segment; however, if R is less than 15 than motion mitigation may not be applied to the particular segment. The particular metric (or metrics) used, and/or the value (or values) thereof may be tailored for a particular application, so that segments exceeding a given amount of motion may have the motion addressed, while for segments not exceeding the given amount of motion, motion correction may be avoided, thereby reducing noise (by increasing the number of preserved counts) and/or reducing computational requirements, or minimizing the scan time. For example, for applications more diagnostically sensitive to respiratory motion, the R threshold may be lowered, or for applications less diagnostically sensitive to respiratory motion the R threshold may be increased.

At 110, if the amount of motion for a given segment satisfied the threshold, motion mitigation is performed on the data for the particular segment. Various motion mitigation techniques may be employed in various embodiments. For example, in some embodiments, PET coincident data for a segment having motion above the threshold may be gated to produce 4D PET image volumes used to generate a motion mitigated image volume. As another example, data corresponding to the most quiescent portion of each respiratory cycle may be retained and used for imaging, with other data discarded and not used. It may be noted that various motion mitigation techniques may have costs or disadvantages associated therewith. For example, statistical quality may be lowered per gate or within a quiescent bin due to the reduction of total data. Further, motion mitigation may degrade the quality of PET image data near a moving feature without a diagnostic benefit.

At 112, it is determined if any additional segments remain (e.g., if there are any combinations of segments and bed positions for which the motion metric has not been determined and analyzed with respect to the threshold). In the illustrated embodiment, each segment from each bed position will be analyzed. If any additional segments remain, then the method 100 returns to 106 for further analysis of at least one additional segment. If all of the segments (e.g., all segments for all bed or detector positions) have been analyzed, then the method 100 proceeds to 114.

At 114, PET image data (e.g., slices of data and/or images from the various bed or detector positions) is stitched together, for example using conventional techniques. Some of the slices may be motion-corrected while others are not (e.g., based on segments and/or using a weighting scheme as discussed herein). (It may be noted that an example of such an image-combining scheme is described and discussed herein, for example, in connection with 340 of FIG. 3 and related discussion.) At 116, a whole-body image is generated. In some embodiments, a portion less than an entire body (e.g., a torso) may be generated. In the illustrated embodiment, steps 114 and 116 may be understood as steps performed to reconstruct an image using information from the various slices and/or segments discussed herein. It may be noted that, in various embodiments, a whole-body image or image for a portion of a body may be generated by reconstructing at least one motion-mitigated image using the mitigated data and reconstructing at least one non-motion-mitigated image using the non-mitigated data, and generating the image from the at least one motion-mitigated image and the at least one non-motion mitigated image. The axial transition from motion-mitigated portions of the image to non-motion-mitigated portions (and/or vice versa) may not necessarily be aligned with the AFOV of the detector, or associated with overlap of the AFOV for embodiments employing multiple AFOV (e.g., multiple bed or table positions). Further, a final image may include a number of portions or sub-images from an image set combined to form the final image, with some images of the image set representing a blend of motion-mitigated and non-motion-mitigated data from a common axial detector position. At 118, the image may be displayed, for example via a screen, to a user or operator. The image may also be stored for later display and/or further processing or analysis.

Figure 4:
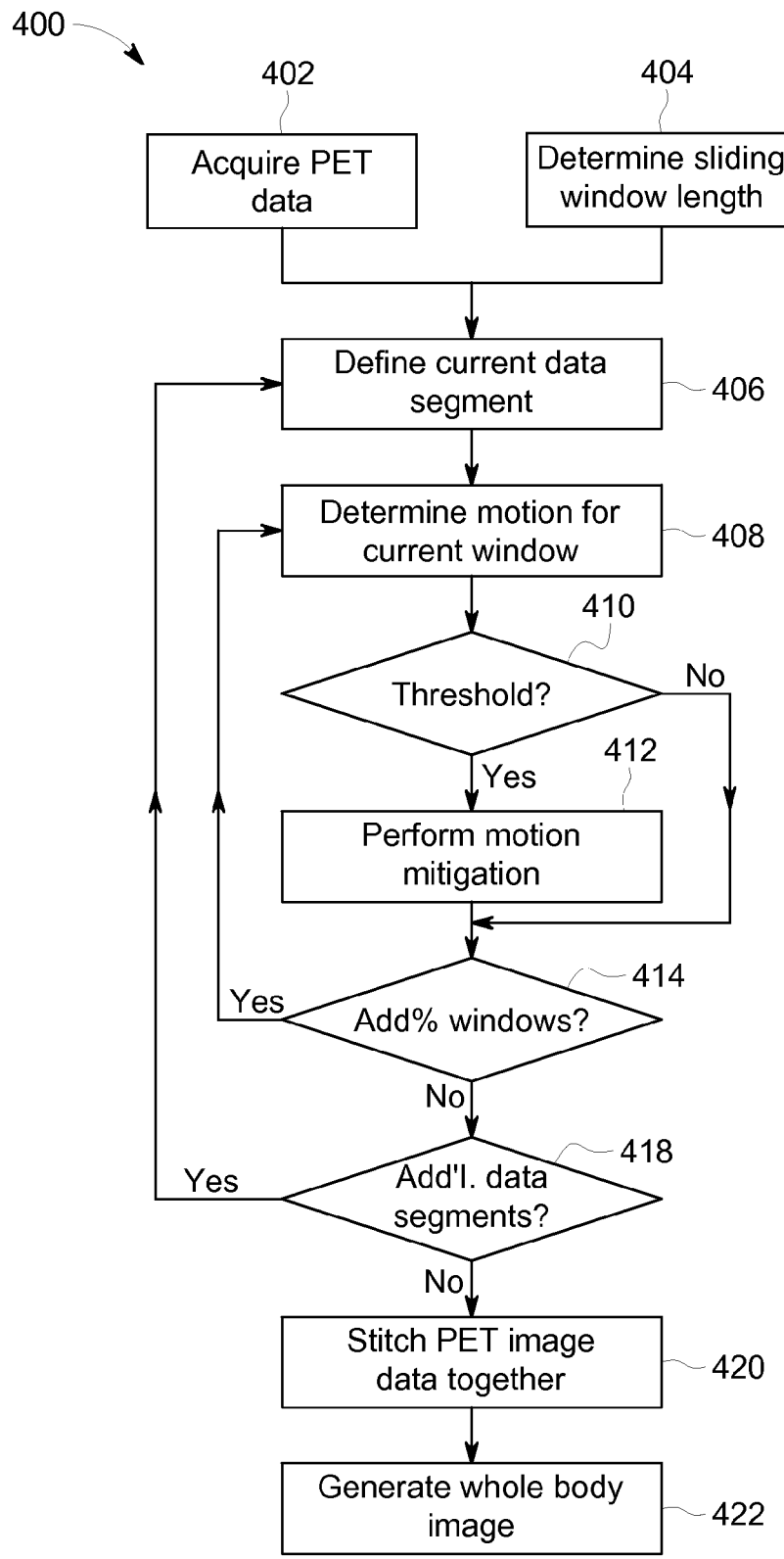
FIG. 4 is a flowchart of a method for PET imaging in accordance with various embodiments.

As indicated above, segments can be a window, such as a sliding window. FIG. 4 is a flowchart of a method utilizing a sliding window to define segment sizes. FIG. 4 provides a flowchart of a method 400 for imaging an object, in accordance with various embodiments. The method 400, for example, may employ or be performed by structures or aspects of various embodiments (e.g., systems and/or methods and/or process flows) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 400 may be able to be used as one or more algorithms to direct hardware (e.g., one or more processing units including one or more aspects of the motion mitigation module 294) to perform one or more operations described herein.

At 402, PET listmode data is acquired, as also discussed, for example, in connection with step 102 of the method 100. At 404, a sliding window length is determined. The sliding window length may be specified as a width (e.g., 5 centimeters), and/or number of rings or slices (3 rings, 5 rings, etc.). The sliding window length, as well as the segment width, may be selected or specified by an operator in various embodiments, or may be automatically determined, for example based on a likelihood of motion, and/or the anticipation of localization of motion for a particular patient and procedure. The embodiment discussed herein in connection with FIG. 4 will be discussed in connection with respiratory motion; however, it should be noted that other motions may additionally or alternatively be addressed in various embodiments.

At 406, a current data segment (e.g., part of a "sliding window" as discussed herein") for the bed position is defined. For example, at the beginning of the analysis an initial bed position may be set as the current bed position, with one or more subsequent bed positions later set as the current bed position after all segments for the initial bed position have been analyzed. At 408, respiratory motion (or the contribution of respiration to motion) for a window of the bed position currently being analyzed is determined. For example, a value for R using a PCA-based approach may be determined. Other motions and/or metrics may be additionally or alternatively considered in other embodiments. Next, at 410, if the motion determined at 408 satisfies a motion threshold, the method proceeds to 412, at which motion mitigation is performed. The method proceeds to 414 from 410 if the motion does not satisfy the threshold, or proceeds to 414 from 412 if the motion does satisfy the threshold.

At 414, it is determined if all windows for a given bed or detector position have been analyzed. If all windows have not been analyzed, the next window of the bed position is selected as the current window, and the method proceeds to 408. If all windows of the current bed position have been analyzed the method proceeds to 418. If at 418, it is determined that additional data segments (e.g., data segments corresponding to bed positions) remain, then the method returns to 406, with the next data segment defined as the current data segment. If it is determined that all data segments have been analyzed, the method proceeds to 420. At 420, PET image data (e.g., slices of data and/or images from the various bed or detector positions) is stitched together, for example using conventional techniques. At 422, a whole-body image is generated. In some embodiments, a portion less than an entire body (e.g., a torso) may be generated.

Figure 5:
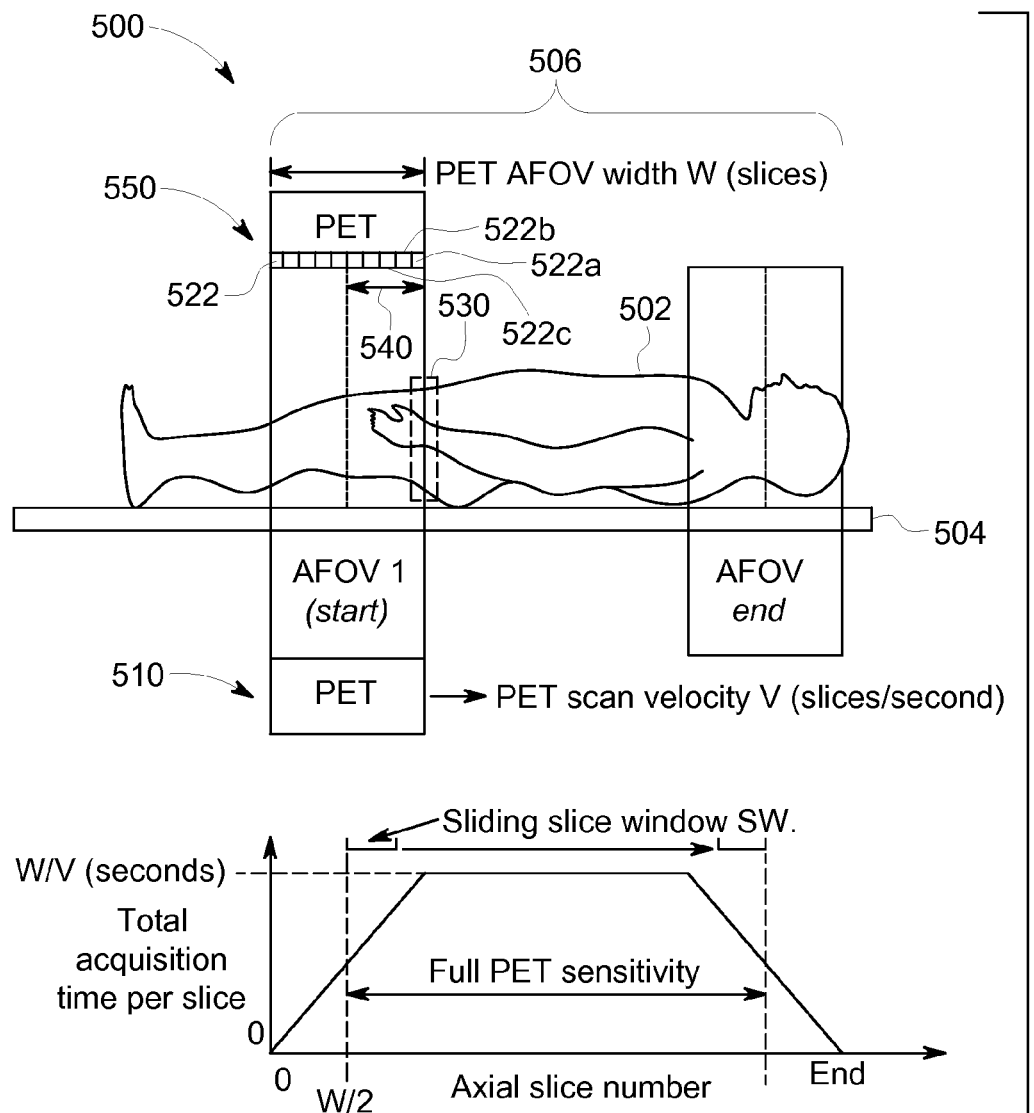
FIG. 5 provides a schematic view of system utilizing continuous detector motion in accordance with various embodiments.

As also indicated above, the motion of the detector along an axial length of an object to be image may be imaged, with various segments defined during the motion of the detector. FIG. 5 provides a schematic view of system 500 utilizing continuous detector motion in accordance with various embodiments. (It may be noted that detector motion or velocity as used herein is used to describe motion of a detector relative to a bed or table, so that detector motion also describes embodiments where a detector is fixed and a bed or table moves along an axis of the detector). In FIG. 5, an object 502 is supported on a bed 504 for imaging over a range 506. The system includes a detector 510 having an AFOV 520 that in turn includes ten rings 522. Each slice of information includes information from a particular axial position of the object 502 being imaged. The segments may be defined by sliding windows associated by body part. For example, a first or forward most ring 522a from the detector 510 may be positioned over (e.g., a predetermined portion of the ring may overlap with a predetermined portion of the body portion) a body portion 530 for a duration or time range 1, a second ring 522b may be positioned over the body portion 530 for a subsequent time range 2, a third ring 522c may be positioned over the body portion 530 for time range 3 subsequent to the time range 2, and so on for all rings of a segment or window. The slice of information for the body portion 530 for the illustrated embodiment includes the data collected by ring 522a for time range 1, the ring 522b for time range 2, the ring 522c for time range 3, and so on. The example of FIG. 5 is presented as a body portion having a width corresponding to a single slice for clarity and ease of illustration. Larger body portions may be considered in various embodiments, and segments may be defined over a width of plural rings or slices.

A segment may be defined for a given number of rings or slices over a specified amount of time to provide a desired amount of coverage for a given body portion or portions. For example, in the illustrated embodiment, a ten-window detector may be used to have a sliding window 540 that is 5 slices wide. If the PET image formation starts at a position corresponding to the midpoint of the detector 510 at an initial detector position 550 (e.g., W/2 where W is the AFOV or total detector axial width), and with the window set at W/2, then the duration of data acquisition for that slice will be given by (W/2)*(1/V), where V is the detector velocity along the axial length of the object 502. For example, for a 10-slice scanner that acquires 10 slices per 120 seconds, the equivalent velocity would be 0.083 slices per second. As shown in view 560, the total acquisition time per slice is greater toward the middle of the object 502 and less toward the ends of the object 502. This is because, at the ends of the range 506, certain portions are not covered by each ring during the detector motion, so that the total acquisition time for a given slice is less. In various embodiments, the total time per slice may plateau to a maximum of W/V for body portions over which all detector slices contribute acquisition time. In various embodiments, the use of sliding windows or time-defined slices with continuous table or detector motion facilitates the use of a patient reference-frame-based process to enable the data-driven processing determination of respiratory motion impact (and/or other motions) on the data. In various embodiments, the segment width and/or velocity may be utilized to define segments to include a minimum time frame worth of information in the segment. The particular segment width may be specified to suit a particular application.

Certain above discussed examples utilize data driven approaches (e.g., using data acquired during a scan) to address motion, or to select portions of information to which motion mitigation processing will be applied. Additionally or alternatively, in various embodiments, predictive models may also be utilized to prospectively identify portions more likely to be subjected to motion. Acquisition parameters for acquiring information (e.g., scan duration for a given body portion or detector position corresponding to a given body portion) may be configured based on the prospective identification, and/or processing parameters (e.g., selection of portions for motion mitigation) may be based on the prospective identification. For example, in some embodiments, computed tomography (CT) information (e.g., a CT scout scan) may be acquired, and used to identify at least one detector position having an increased likelihood of motion relative to at least one other detector position. In alternate embodiments, for example, MRI-based information (again, from a scout scan) may be utilized to identify such regions. Then, the scan time for the portion identified as more likely to have motion may be increased relative to other portions. Additionally or alternatively, the portions more likely to have motion may be processed after acquisition using additional motion mitigation-related processing techniques relative to the portions not identified as more likely to have motion. Also, data acquisition time for these identified portions may be modified to be increased based upon a preferred motion mitigation technique (such as 4D or quiescent-period gating). For example, the portions more likely to have motion may be analyzed using various techniques discussed herein (e.g., in connection with FIGS. 1-5), while other portions (e.g., portions not likely to have motion and/or portions for which an expected motion may not have sufficient diagnostic consequence) may not, thereby reducing scan time, computational time or other computational requirements.

In some embodiments, the position of the lungs of a patient being scanned may be estimated based a CT scout scan. Then, a scan range of the object may be normalized based on the position (e.g., size and location) of the lungs. Next, for a plurality of corresponding historical detector positions (e.g., detector positions corresponding to the normalized scan range), an amount of historical respiratory motion based on a PCA of historical scans may be determined. For example, a value of R for each detector position of an historical database may be used to predict a value of R for each corresponding position of a scan being configured. Then, the scan may be performed using longer acquisition duration for those detector positions having a value of R exceeding a threshold.

Figure 6:
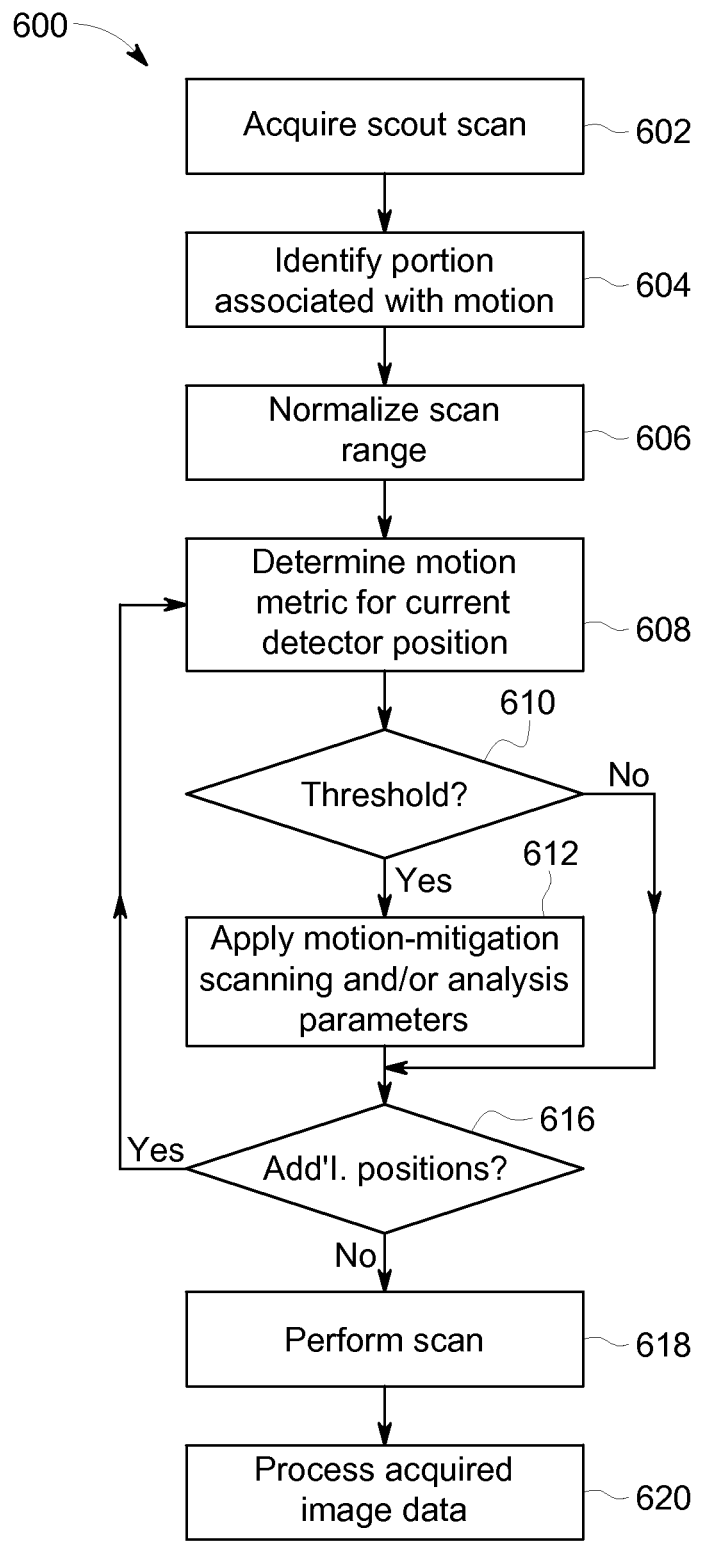
FIG. 6 is a flowchart of a method for imaging in accordance with various embodiments.

FIG. 6 is a flowchart of a method for determining scanning and/or processing parameters and/or imaging, in accordance with various embodiments. The method 600, for example, may employ or be performed by structures or aspects of various embodiments (e.g., systems and/or methods and/or process flows) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 600 may be able to be used as one or more algorithms to direct hardware (e.g., one or more processing units including one or more aspects of the motion mitigation module 294) to perform one or more operations described herein.

At 602, a scout scan scout scan is acquired of a patient being imaged. The scout scan may be acquired using CT as one example, or using MRI as another example. A scout scan may be at a lower resolution and/or acquire less information than a diagnostic scan. For example, in contrast to a diagnostic CT image that may be acquired at a series of projections or views (e.g., a complete rotation of views), the scout scan may be acquired at a single view or projection (e.g., at 0 degrees for a coronal scout).

At 604, a portion of the patient corresponding to the potential for motion is determined. For example, the lungs may be associated with respiratory motion. The location (e.g., position and size) of the lungs may be determined from the scan image by identifying a superior location and an inferior location defining the extent of the lungs. The identification may be made by an operator viewing the scout scan and providing an input (e.g., highlighting the area on a touchscreen, setting a cursor or bar to corresponding positions of the displayed scout scan, or the like) in some embodiments. In other embodiments, the lungs may be identified in the scout scan automatically or autonomously, for example using software configured to identify portions of anatomy in a scout scan.

At 606, the scan range (e.g., the range of the patient to be scanned) is normalized. Normalizing the scan range allows for use of a common database, lookup table, and/or other historical relationship to be used in analyzing a given patient for whom a scan is to be performed. In alternative embodiments, databases, lookup tables, and/or other historical relationships may be configured based on patient size, shape, procedure, or the like.

Figure 7:
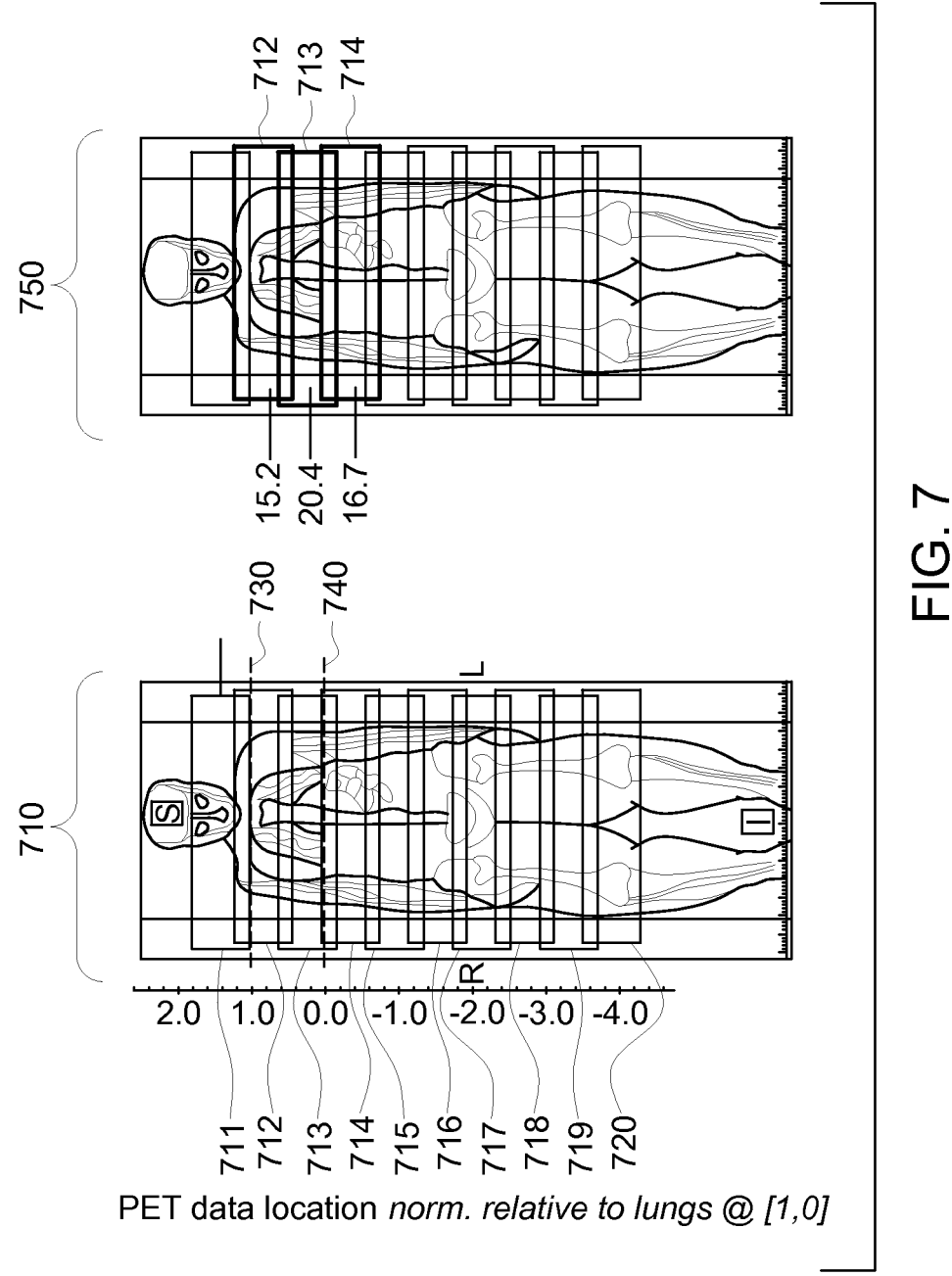
FIG. 7 depicts an example of scan range normalization in accordance with various embodiments.

FIG. 7 depicts an example of scan range normalization. In view 710, a series of overlapping FOVs or bed positions 711, 712, 713, 714, 715, 716, 717, 718, 719, and 720 are shown. The illustrated FOVs correspond to bed positions having a 20% overlap, and to a range extending from a portion of the skull to about the knee. The various locations along the length of the patient are normalized in view 710. For example, the dashed line 730 corresponds to a superior-most location of the lung, and the dashed line 740 corresponds to an inferior-most location of the lung. The superior location 730 is assigned a normalized value of 1.0, and the inferior location 740 is assigned a normalized value of 0.0. Other locations along the length of the patient are assigned values based on their relative position with respect to the superior and inferior locations.

With the locations of the patient to be scanned assigned normalized values and the inferior and superior locations identified, each of the resulting bed positions may be compared to historical counterparts to determine likelihood of motion. For example, in the illustrated embodiment, a lookup table may be utilized to find a historical model or other relationship similar to the normalized scan range for the patient to be scanned, and the values of a motion metric for the historical comparison used to determine the corresponding values for the normalized scan range of the patient to be scanned. In the illustrated embodiment, the motion metric is R, as determined for the historical model. For example, as seen in view 750, the bed position 712 has an expected R value of 15.2 based on historical comparisons, the bed position 713 has an expected R value of 20.4 based on historical comparisons, and the bed position 714 has an expected R value of 16.7 based on historical comparisons, with all other positions having an expected R value below 15 based on historical comparisons. With a threshold set at R=15, positions 712, 713, and 714 may thus be identified as being more likely to be affected by respiratory motion in the illustrated embodiments, with the remaining positions not identified as more likely to be affect by respiratory motion, or identified as not likely to be affected by respiratory motion. One or more scanning and/or acquisition settings for the positions identified as more likely affected to be affected by motion (e.g., positions 712, 713, 714 in the example discussed above) may be adjusted relative to the other portions to account for the anticipated motion. For example, an acquisition time for the identified position may be lengthened relative to the un-identified positions. In the illustrated embodiment, a longer scan duration may be used for positions 712, 713, and 714. Further, as position 713 has the highest expected R value, the acquisition time for position 713 may be set higher than the acquisition time for position 712 or position 714.

Returning to FIG. 6, at 608, a value of a motion metric for historical counterparts of a current bed position, such as an historical value of R, is determined. For example, a lookup table or other relationship characterizing values of R for various normalized positions may be utilized, with the R value for the most similar historical normalized position for a given current position being analyzed used to determine the value of R expected for the currently analyzed position. In various embodiments, an expected R value for a currently analyzed position may be interpolated using two or more historical values.

At 610, it is determined for the given position if the expected motion measure determined based on historical comparisons (e.g., a most similar historical measure) satisfies a threshold. If the threshold is satisfied, the method proceeds to 612, and motion mitigation scanning and/or analysis parameters are applied. For example, a scan time or duration for the position being analyzed may be increased at 612 based on the value of R, with higher values of R resulting in longer scan times or durations. If the threshold is not satisfied, the method proceeds to 616.

At 616, it is determined if more positions remain to be analyzed. If more positions remain, the method returns to 608 to analyze a new position yet to be analyzed. If no positions remain, the method proceeds to 618.

At 618, a scan is performed using the determined scan parameters. For example, a PET system may sequentially acquire PET imaging information at each of the predetermined bed positions. For each bed position for which the expected motion did not satisfy the threshold, a minimum or default acquisition time may be utilized. For those bed positions for which the threshold was satisfied, an extended or longer acquisition time may be utilized during the PET scan. In various embodiments, utilization of longer acquisition durations for positions more likely to be affected by motion allows for collection of additional information to offset information that may be discarded as part of motion mitigation, helping to reduce noise and preserve image quality.

At 620, the acquired image data is processed. For example, values of R for each position may be determined and used in the reconstruction of an image (e.g., using one or more aspects of embodiments discussed in connection with FIG. 1-5.) As another example, the values of R (or other metric) determined for each position of the recently acquired scan may be added to the database or otherwise incorporated into a historical model to add information from the recently acquired scan to the data base and to refine the historical model. Use of a method incorporating one or more aspects of the method 600 may provide a number of advantages. For example, based on the expected motion determined, a suggested protocol may be automatically generated and displayed to a user for approval prior to scanning. As another example, the estimation of motion-affected areas may save a user time spent on and improve accuracy related to manual selection of a scanning protocol. Further, the system knowledge may grow over time as more acquired image data is obtained, increasing accuracy further.

Figure 8:
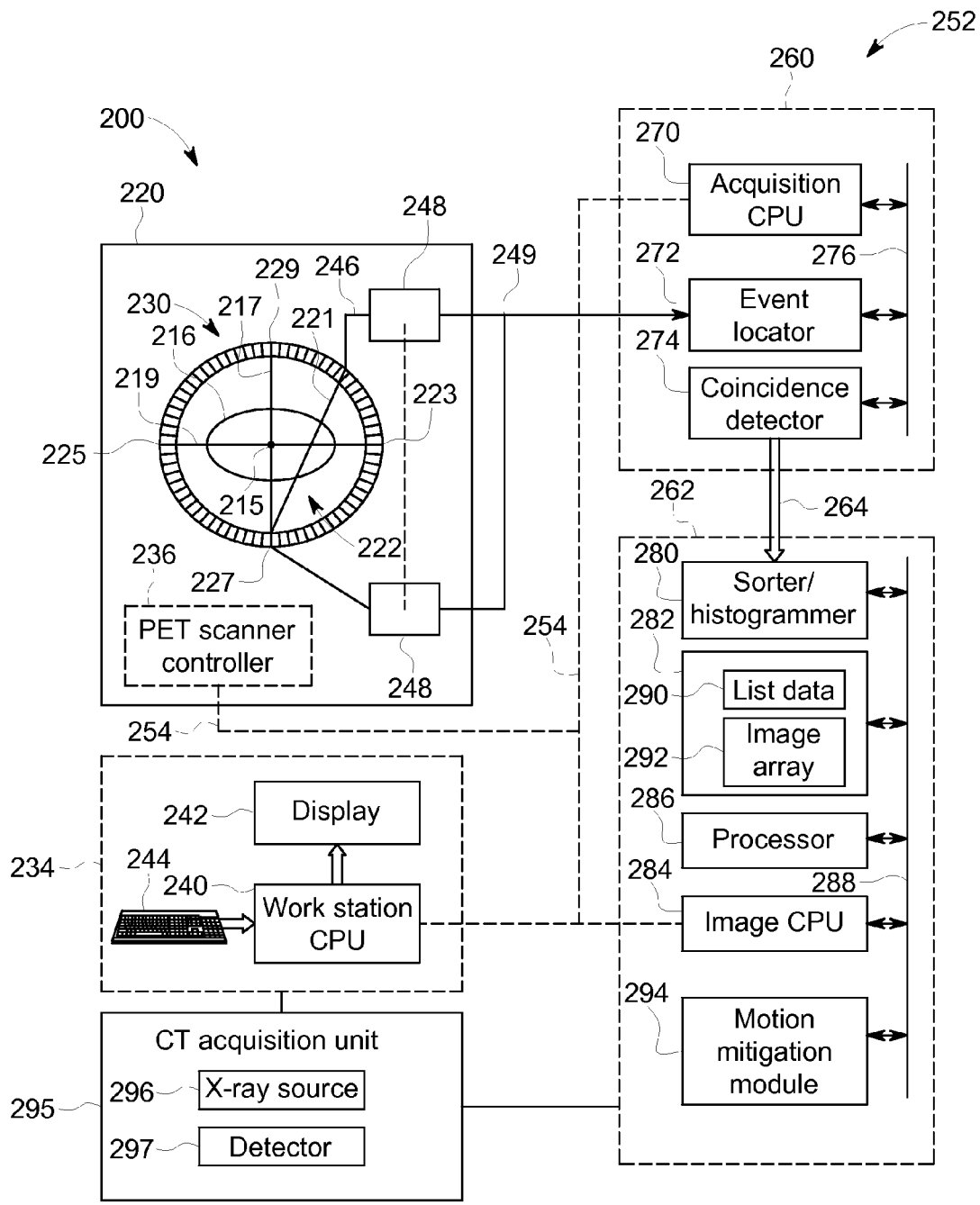
FIG. 8 provides a block diagram of a PET imaging system in accordance with various embodiments.

Various methods and/or systems (and/or aspects thereof) described herein may be implemented using a medical imaging system. For example, FIG. 8 is a block schematic diagram of an exemplary PET imaging system 200 that may be utilized to implement various embodiments discussed herein. The PET imaging system 200 may be used to acquire PET coincidence event data during a PET scan. The PET imaging system 200 includes a gantry 200, an operator workstation 234, and a data acquisition subsystem 252. In a PET scan, a patient 216 is initially injected with a radiotracer. The radiotracer comprises bio-chemical molecules that are tagged with a positron emitting radioisotope and can participate in certain physiological processes in the body of the patient 216. When positrons are emitted within the body, they combine with electrons in the neighboring tissues and annihilate creating annihilation events. The annihilation events usually result in pairs of gamma photons, with 511 keV of energy each, being released in opposite directions. The gamma photons are then detected by a detector ring assembly 230 within the gantry 220 that includes a plurality of detector elements (e.g., 223, 225, 227, 229). The detector elements may include a set of scintillator crystals arranged in a matrix that is disposed in front of a plurality of photosensors such as multiple photo multiplier tubes (PMTs) or other light sensors. When a photon impinges on the scintillator of a detector element, the photon produces a scintillation (e.g., light) in the scintillator. Each scintillator may be coupled to multiple photo multiplier tubes (PMTs) or other light sensors that convert the light produced from the scintillation into an electrical signal. In addition to the scintillator-PMT combination, pixilated solid-state direct conversion detectors (e.g., CZT) may also be used to generate electrical signals from the impact of the photons.

The detector ring assembly 230 includes a central opening 222, in which an object or patient, such as the patient 216 may be positioned, using, for example, a motorized table (not shown). The scanning and/or acquisition operation is controlled from an operator workstation 234 through a PET scanner controller 236. Typical PET scan conditions include data acquisition at several discrete table locations with overlap, referred to as 'step-and-shoot' mode. Optionally, during the PET scan may include the motorized table may traverse through the central opening 222 while acquiring PET coincidence event data, for example, a continuous table motion (CTM) acquisition. The motorized table during the CTM acquisition may be controlled by the PET scanner controller 236. During the CTM acquisition, the motorized table moves through the central opening 222 at a consistent or stable velocity (e.g., within a predetermine velocity threshold during the PET scan).

A communication link 254 may be hardwired between the PET scanner controller 236 and the workstation 234. Optionally, the communication link 254 may be a wireless communication link that enables information to be transmitted to or from the workstation 234 to the PET scanner controller 236 wirelessly. In at least one embodiment, the workstation 234 controls real-time operation of the PET imaging system 200. The workstation 234 may also be programmed to perform medical image diagnostic acquisition in reconstruction processes described herein.

The operator workstation 234 includes a work station central processing unit (CPU) 240, a display 242 and an input device 244. The CPU 240 connects to a communication link 254 and receives inputs (e.g., user commands) from the input device 244, which may be, for example, a keyboard, a mouse, a voice recognition system, a touch-screen panel, or the like. Through the input device 244 and associated control panel switches, the clinician can control the operation of the PET imaging system 200. Additionally or alternatively, the clinician may control the display 242 of the resulting image (e.g., image-enhancing functions), physiologic information (e.g., the scale of the physiologic waveform), the position of the patient 216, or the like, using programs executed by the CPU 240.

During operation of the PET imaging system, for example, one pair of photons from an annihilation event 215 within the patient 216 may be detected by two detectors 227 and 229. The pair of detectors 227 and 229 constitute a line of response (LOR) 217. Another pair of photons from the region of interest 215 may be detected along a second LOR 219 by detectors 223 and 225. When detected, each of the photons produce numerous scintillations inside its corresponding scintillators for each detector 223, 225, 227, 229, respectively. The scintillations may then be amplified and converted into electrical signals, such as an analog signal, by the corresponding photosensors of each detector 223, 225, 227, 229.

A set of acquisition circuits 248 may be provided within the gantry 220. The acquisition circuits 248 may receive the electronic signals from the photosensors through a communication link 246. The acquisition circuits 248 may include analog-to-digital converters to digitize the analog signals, processing electronics to quantify event signals and a time measurement unit to determine time of events relative to other events in the system 200. For example, this information indicates when the scintillation event took place and the position of the scintillator crystal that detected the event. The digital signals are transmitted from the acquisition circuits 248 through a communication link 249, for example, a cable, to an event locator circuit 272 in the data acquisition subsystem 252.

The data acquisition subsystem 252 includes a data acquisition controller 260 and an image reconstruction controller 262. The data acquisition controller 260 includes the event locator circuit 272, an acquisition CPU 270 and a coincidence detector 274. The data acquisition controller 260 periodically samples the signals produced by the acquisition circuits 248. The acquisition CPU 270 controls communications on a back-plane bus 276 and on the communication link 254. The event locator circuit 272 processes the information regarding each valid event and provides a set of digital numbers or values indicative of the detected event. For example, this information indicates when the event took place and the position of the scintillator crystal that detected the event. An event data packet is communicated to the coincidence detector 274 through a communication link 276. The coincidence detector 274 receives the event data packets from the event locator circuit 272 and determines if any two of the detected events are in coincidence.

Coincidence may be determined by a number of factors. For example, coincidence may be determined based on the time markers in each event data packet being within a predetermined time period, for example, 12.5 nanoseconds, of each other. Additionally or alternatively, coincidence may be determined based on the LOR (e.g., 217, 219) formed between the detectors (e.g., 223 and 225, 227 and 229). For example, the LOR 217 formed by a straight line joining the two detectors 227 and 229 that detect the PET coincidence event should pass through a field of view in the PET imaging system 200. Events that cannot be paired may be discarded by the coincidence detector 274. PET coincidence event pairs are located and recorded as a PET coincidence event data packet that is communicated through a physical communication link 264 to a sorter/histogrammer circuit 280 in the image reconstruction controller 262.

The image reconstruction controller 262 includes the sorter/histogrammer circuit 280. During operation, the sorter/histogrammer circuit 280 generates a PET list data 290 or a histogram, which may be stored on the memory 282. The term "histogrammer" generally refers to the components of the scanner, e.g., processor and memory, which carry out the function of creating the PET list data 290. The PET list data 290 includes a large number of cells, where each cell includes data associated with the PET coincidence events. The PET coincidence events may be stored in the form of a sinogram based on corresponding LORs within the PET list data 290. For example, if a pair of PET gamma photons are detected by detectors 227 and 229, the LOR 217 may be established as a straight line linking the two detectors 227 and 229. This LOR 217 may be identified as two dimensional (2-D) coordinates (r, θ, Δt), wherein r is the radial distance of the LOR from the center axis of the detector ring assembly 230, θ is the trans-axial angle between the LOR 217 and the X-axis, and Δt is the change in time of the detection of the photons between the two detectors 227 and 229 of the LOR 217. The detected PET coincidence events may be recorded in the PET list data 290. As the PET scanner 200 continues to acquire PET coincidence events along various LORs (e.g., 217, 219, 221), these events may be binned and accumulated in corresponding cells of the PET list data 290. The result is a 2-D sinogram $\lambda(r, \theta, \Delta t)$, each of which holds an event count for a specific LOR. In another example, for a three dimensional (3-D) sinogram, an LOR 217, 219 may be defined by four coordinates (r, θ, z, Δt), wherein the third coordinate z is the distance of the LOR from a center detector along a Z-axis.

Additionally, the communication bus 288 is linked to the communication link 252 through the image CPU 284. The image CPU 284 controls communication through the communication bus 288. The array processor 286 is also connected to the communication bus 288. The array processor 286 receives the PET list data 290 as an input and reconstructs images in the form of image arrays 292. Resulting image arrays 292 are then stored in a memory module 282. The images stored in the image array 292 are communicated by the image CPU 284 to the operator workstation 246.

The PET imaging system 200 also includes a motion mitigation module 294. The depicted motion mitigation module 294 is configured to perform one or more aspects, steps, operations or processes discussed herein (e.g., in connection with methods discussed in connection with FIG. 1, FIG. 4, and/or FIG. 6.) For example, the motion mitigation module 294, and/or other aspect(s) of a processing unit, may be configured to identify portions of acquired information for which motion mitigation processing may be applied. As another example, the motion mitigation module 294, and/or other aspect(s) of a processing unit may determine which bed or detector positions of a scan to be performed are more likely to be affected by motion, and to configure acquisition parameters (e.g., scan duration) based on the determination of which positions are more likely to be affected by motion.

The depicted motion mitigation module 294 is an example of a processing unit configured to perform one or more tasks or operations disclosed herein. A processing unit as used herein may include processing circuitry configured to perform one or more tasks, functions, or steps discussed herein. It may be noted that "processing unit" as used herein is not intended to necessarily be limited to a single processor or computer. For example, a processing unit may include multiple processors and/or computers, which may be integrated in a common housing or unit, or which may distributed among various units or housings.

The PET imaging system 200 also includes a CT acquisition unit 295. The CT acquisition unit 295 is configured to acquire CT information. The CT acquisition unit, for example, may include an X-ray source 296 and detector 297 configured to rotate on a gantry about an object to be imaged. The CT acquisition unit 295 may be utilized for example, in connection with dual modality PET/CT imaging. The CT acquisition unit 295 may be utilized to acquire a scout scan (see, e.g., 602 of FIG. 6 and related discussion). It may be noted that, in various embodiments, the CT acquisition unit may be substituted with, replaced by, or supplemented by a MRI or other imaging system to perform generally similar functions as the CT acquisition unit as described herein (e.g., acquisition of information for a scout scan).

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation may be particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optic drive, and the like. The storage device may also be other similar means for loading computer programs or other instructions into the computer or processor.

As used herein, the term "computer," "controller," "system," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A method comprising:
  acquiring, with a detector comprising a plurality of rings defining corresponding slices, emission event data of an object of interest;
  determining an axial segment size for a plurality of segments to be independently analyzed for motion independent of each other;
  determining, with one or more processing units, using the emission event data, an amount of motion for each of the plurality of segments independently of each other, wherein each segment comprises at least one of the slices and corresponds to less than an axial field of view (AFOV) of the detector;
  performing, with the one or more processing units, motion mitigation for segments for which the amount of motion satisfies a threshold to provide motion mitigated data, and not performing motion mitigation for segments for which the amount of motion does not satisfy the threshold to provide non-mitigated data;
  reconstructing, with the one or more processing units, an image using the motion mitigated data and the non-mitigated data; and
  displaying the image on a display.

2. The method of claim 1, wherein each segment comprises only a single slice of data, wherein each slice corresponds to data collected by a single ring of the detector at a given bed position.

3. The method of claim 1, wherein each segment comprises a corresponding sliding window of slices, each sliding window comprising a plurality of adjacent slices defining a width, the width being less than the AFOV, wherein each slice corresponds to data collected by a single ring of the detector at a given bed position.

4. The method of claim 3, wherein adjacent sliding windows share at least one common slice.

5. The method of claim 4, further comprising assigning a weight to each of the sliding windows based on a detected sliding window amount of motion for each sliding window, wherein motion-mitigated data and non-motion-mitigated data for each sliding window are combined based on the corresponding weight.

6. The method of claim 1, wherein the emission data is acquired during motion of a table on which the object is disposed wherein each segment corresponds to a location along an axial length of the object.

7. The method of claim 1, wherein the amount of motion is determined using a principal components analysis (PCA), and wherein the threshold corresponds to an amount of respiratory motion.

8. The method of claim 1, further comprising:
acquiring, with a computed tomography (CT) acquisition unit, computed tomography (CT) information of the object before acquiring the emission event data of the object;
identifying, with the one or more processors, at least one detection position having an increased likelihood of motion; and
acquiring the emission data over a longer period of time for the at least one detection position having an increased likelihood of motion relative to a standard period of time.

9. The method of claim 8, wherein identifying the at least one detection position having an increased likelihood of motion comprises:
estimating a position of lungs of the object;
normalizing a scan range of the object based on the position of the lungs;
determining, for each of a plurality of historical detector positions obtained from an historical database corresponding to the normalized scan range, a metric corresponding to an amount of historical respiratory motion; and
identifying the at least one detection position based on the metric for a corresponding historical detector position for the at least one detection position exceeding a threshold.

10. The method of claim 1, wherein reconstructing the image comprises reconstructing at least one motion-mitigated image using the mitigated data and reconstructing at least one non-motion-mitigated image using the non-mitigated data, and generating the image from the at least one motion-mitigated image and the at least one non-motion mitigated image.

11. A positron emission tomography (PET) imaging system comprising:
a PET detector comprising a plurality of rings defining corresponding slices;
at least one processing unit operably coupled to the PET detector and configured to
acquire from the detector PET coincidence event data of an object of interest;
determine an axial segment size for a plurality of segments to be independently analyzed for motion independent of each other;
determine, using the emission event data, an amount of motion for each of the plurality of segments independently of each other, wherein each segment corresponds to less than an axial field of view (AFOV) of the detector;
perform motion mitigation for segments for which the amount of motion satisfies a threshold to provide motion mitigated data, and to not perform motion mitigation for segments for which the amount of motion does not satisfy the threshold to provide non-mitigated data; and
reconstruct an image using the motion mitigated data and the non-mitigated data; and
a display configured to display the reconstructed image.

12. The PET imaging system of claim 11, wherein each segment comprises only a single slice of data, wherein each slice corresponds to data collected by a single ring of the detector at a given bed position.

13. The PET imaging system of claim 11, wherein each segment comprises a sliding window of slices, each sliding window comprising a plurality of adjacent slices defining a width, the width being less than the AFOV, wherein each slice corresponds to data collected by a single ring of the detector at a given bed position.

14. The PET imaging system of claim 13, wherein adjacent sliding windows share at least one common slice.

15. The PET imaging system of claim 13, wherein the at least one processing unit is configured to assign a weight to each of the sliding windows based on a detected sliding window amount of motion for each sliding window, and to combine motion-mitigated data and non-motion-mitigated data for each sliding window based on the corresponding weight.

16. The PET imaging system of claim 11, wherein the PET coincidence data is acquired continuously during motion of a table on which the object is disposed, wherein each segment corresponds to a location along an axial length of the object.

17. The PET imaging system of claim 11, wherein the amount of motion is determined using a principal components analysis (PCA), and wherein the threshold corresponds to an amount of respiratory motion.

18. The PET imaging system of claim 11, further comprising:
a computed tomography (CT) acquisition unit configured to acquire computed tomography (CT) information of the object before acquiring the PET coincidence event data of the object;
wherein the at least one processing unit is further configured to
identify at least one detection position having an increased likelihood of motion; and
control the PET acquisition unit acquire the PET coincidence data over a longer period of time for the at least one detection position having an increased likelihood of motion relative to a standard period of time.

19. The PET imaging system of claim 18, wherein the at least one processing unit is configured to reconstruct at least one motion-mitigated image using the mitigated data and reconstruct at least one non-motion-mitigated image using the non-mitigated data, and generate the image from the at least one motion-mitigated image and the at least one non-motion mitigated image.

20. The PET imaging system of claim 18, wherein the at least one processor is configured to:
estimate a position of lungs of the object;
normalize a scan range of the object based on the position of the lungs; and
determine the amount of motion for each detection position using corresponding historical detection positions and an amount of historical respiratory motion based on a statistical analysis of corresponding historical scans from an historical database of past scans.

* * * * *